(12) United States Patent
O'Toole et al.

(10) Patent No.: US 6,336,749 B1
(45) Date of Patent: Jan. 8, 2002

(54) JOINTED OPTICAL FIBERS

(75) Inventors: Eamonn O'Toole; Timothy Davern; Michael Crowley; Conleth Denis Hussey; Paul F. O'Sullivan; Kenneth Peter Oakley; Elaine O'Brien, all of Co. Limerick (IE)

(73) Assignee: Viveen Limited, Co. Limerick (IE)

( * ) Notice: Subject to any disclaimer, the term of this patent is extended or adjusted under 35 U.S.C. 154(b) by 0 days.

(21) Appl. No.: 09/433,379

(22) Filed: Nov. 3, 1999

(30) Foreign Application Priority Data

Oct. 22, 1999 (IE) .............................................. S990889

(51) Int. Cl.[7] .............................................. G02B 6/255
(52) U.S. Cl. .......................................... 385/96; 385/99
(58) Field of Search ........................ 385/95–99; 65/385, 65/406, 407, 412, 435

(56) References Cited

U.S. PATENT DOCUMENTS

| 5,074,633 A | | 12/1991 | Cohen et al. | |
| 5,075,633 A | * | 12/1991 | Cohen et al. | .................. 385/43 |
| 5,838,867 A | * | 11/1998 | Onishi et al. | ............... 385/123 |
| 5,995,695 A | * | 11/1999 | Aikawa et al. | ............. 385/123 |

FOREIGN PATENT DOCUMENTS

| EP | 0 340 042 A1 | | 11/1989 |
| EP | 0 340 042 A1 | * | 11/1989 |
| EP | 0 890 853 A1 | | 1/1999 |
| JP | 3-130705 | | 6/1991 |

OTHER PUBLICATIONS

"Modified Figure of Merit for Dispersion Compensated Optical Fibres", R. Tewari et al., Optics Communications 155, Oct. 15, 1998, p.260–262.
European Search Report.
"Low–Loss Joints Between Dissimilar Fibres by Tapering Fusion Splices", D.B. Mortimore et al., Electronics Letters, vol. 22, No. 6, Mar. 13, 1986, pp. 318–319.

"Low–Loss Fusion Splicing of PCVD–DFSM Fibers", W. Zell et al., Journal of Lightwave Technology, vol. LT–5, No. 9, Sep. 1987, pp. 1192–1195.
"Low–Loss fattened fusion splices between fibres", E.M. O'Brien et al., Electronics Letters, vol. 35, No. 2, Jan. 21, 1999, pp. 168–169.
"Design Limitation on Tapers and Couplers in a single Mode Fibres", by Stewart et al., Department of Applied Mathematics, Australian National University, Canberra, IOOC–ECOC 1985, pp. 559–562.
O'Brien et al., "Low–Loss fattened fusion spliced between different fibres", Electronics Letters, vol. 35, No. 2, Jan. 21, 1999, pp. 168–169.

* cited by examiner

*Primary Examiner*—Akm E. Ullah
*Assistant Examiner*—Michelle R. Connelly-Cushwa
(74) *Attorney, Agent, or Firm*—McDermott, Will & Emery (57) ABSTRACT

A method for making an optical fiber fusion joint between two dissimilar single mode optical fibers (10,40) where the fibers have different core sizes and/or different refractive index profiles due to different patterns of dopant. One fiber may be a standard step-index communication fiber with a 9 μm core diameter and a numerical aperture (NA) of about 0.1, and the second fiber may be a dispersion compensating fiber (DCF) with a multiple layer refractive index profile. The second fiber alternatively may have a smaller core and a higher NA, up to about 0.3. A diffused dopant region, with a gradual longitudinal variation in diffusion, is included adjacent to the splice. The diameter of the communications fiber core increases gradually within the diffusion region as the splice joint is approached along this fiber. The diffusion of the various dopants in the second fiber tend to cause its refractive index profile to converge optically to that of the diffused step index communication fiber. As a consequence of the gradually varying diffusion region, the optical losses associated with the splice are relatively low, even when there is relatively high mismatch between the mode field diameters and mode field shapes (at a signal wavelength) in the respective fibers. In another embodiment a fiber fattening technique is used to fatten the fibers in the region of the splice to reduce losses.

30 Claims, 5 Drawing Sheets

JOINTED OPTICAL FIBERS

FIELD OF THE INVENTION

The invention relates to the field of optical fiber systems involving connections between dissimilar optical fibers.

BACKGROUND

In addition to the standard communications fiber, a number of new types of optical fiber have been introduced into optical fiber based communication systems in recent years. Two groups of new fibres can be identified in terms of their refractive index distributions. The first group comprises dispersion controlling fibres with multiple layered refractive index profiles, while the second group comprises fibers that have a small core diameter but a high numerical aperture (NA) as compared with the standard communications fiber. The NA is defined as the square root of the difference between the squares of the refractive indices of the core and the cladding.

The standard communications single mode fiber is exemplified by the Corning product SMF 28 step index single mode fibre which consists of a circular core region of raised, approximately uniform, refractive index and a surrounding cladding region of uniform refractive index. The fiber consists of silica glass with the core doped with germania to give a raised refractive index and the cladding is typically undoped pure silica. The core diameter is about 9.0 $\mu$m and the mode field diameter (MFD) is about 10 $\mu$m at the wavelength of 1.55 $\mu$m and the NA is about 0.1.

The dispersion controlling fiber (DCF) is exemplified by the Lucent Technologies DCF fiber which is used for dispersion compensation. This fiber has a multiple layered refractive index profile consisting of a raised refractive index core (doped with germania), surrounded by a ring layer of lowered refractive index (doped with fluorine), surrounded, in turn, by a slightly raised ring layer (doped with germania). The DCF fiber has a MFD of about 5.0 $\mu$m at the wavelength of 1.55 $\mu$m. The raising and lowering of the refractive index is with reference to the uniform silica cladding which surrounds the whole.

The high NA fibres are exemplified by the erbium doped fibre (e.g. Fibercore DF 1500F), the photosensitive fibre for Bragg grating writing (e.g. Fibercore PS1500) and the small core fibres used for pigtailing optoelectronic components (e.g. Fibercore SM1500).

In many potential applications, it is envisaged that these special optical fibers will be spliced permanently to standard communication fibers.

A standard method for connecting two lengths of standard communication fiber, referred to as fusion splicing, involves butting together the prepared ends of two fibers in the presence of a heat source e.g., a flame or electric arc such that the fiber ends melt and coalesce. Fusion splices are subject to optical losses, referred to collectively as "splice loss." Various factors have been identified as contributing to splice loss, including lateral offset of the cores, differences in the optical characteristics of the mating fibers, and changes in the refractive index profile that take place during fusion.

When fibers having widely dissimilar mode field diameters (MFDs) and mode field shapes (MFSs) are spliced to one another, the mismatch of the mode fields at the location of the splice can result in high splice loss.

One technique for mitigating this contribution to the splice loss is described, for example, by D. B. Mortimore and J. V. Wright, "Low-Loss Joints between Dissimilar Fibers by Tapering Fusion Splices," Electronics Letters, 22 (Mar. 13, 1986), pp. 318–319. This tapering technique involves first making a standard fusion splice and then drawing the softened glass in the vicinity of the splice such that the glass becomes constricted, decreasing the diameter of both the cladding and the core in the vicinity of the splice. This tapered region is said to function as a mode transformer that transforms the optical mode field of one fiber to that of the other with low optical loss. A standard communication fiber has reportedly been joined, with a total splice loss of 0.56 dB, to a fiber having a core diameter of 3.8 $\mu$m and an MFD of 4.34 $\mu$m. This tapering by drawing approach has never been practically demonstrated outside the laboratory.

An alternative approach to fusion splicing of fibers, based on the diffusion of dopants in the refractive index profile, was reported by, for example, W. Zell, et al., "Low-Loss Fusion Splicing of PCVD-DFSM Fibers," Journal of Lightwave Technology, LT-5, (September 1987), pp. 1192–1195. The approach of Zell, et al. involves spreading the smaller of the cores of the (not very dissimilar) mating fibers by diffusing the index-raising dopant during an annealing step after the splice is formed. (The index-lowering dopant of the cladding was also found to diffuse during heating.). Zell, et al. reported that diffusion tapering was effective in reducing the optical loss in a fusion splice between a depressed cladding, single-mode (DCSM) fiber and a dispersion flattened, single-mode (DFSM) fiber having a smaller MFD than the DCSM fiber.

Significantly, the heat treatment, reported in that work, caused the concentrations of germanium and fluorine dopants, respectively, to exhibit a diffusion profile extending axially from the joint. At a wavelength of 1.3 $\mu$m, a splice loss of 0.30 dB was achieved by Zell, et al. This splice loss was smaller than the theoretical loss in a step joint between the two fibers, and the difference was attributed to diffusion tapering. However, at a wavelength of 1.55 $\mu$m, a somewhat greater loss, 0.35 dB, was observed, and no reduction of loss attributable to diffusion tapering was observed.

In a practical communication system, it is desirable for splices between different fibers to exhibit still smaller losses, e.g., losses much smaller than 0.3 dB. The Zell, et al. reference does not disclose a technique that can produce low-loss splices between fibers having drastically different core sizes, refractive index profiles, MFDs and MFSs. Indeed, at 1.55 $\mu$m, which corresponds approximately to the operating wavelength of erbium amplifiers, Zell, et al. has failed to show any improvement in splice loss by diffusion tapering. Moreover, the improved splice reported there involved a pair of only moderately dissimilar fibers both with relatively large cores, i.e., fibers with respective MFDs of 10.1 $\mu$m and 7.6 $\mu$m at a wavelength of 1.55 $\mu$m.

The work of Zell et el. has been extended by Cohen et al. ('Optical communications system comprising a fiber amplifier' U.S. Pat. No. 5,074,633 Dec. 24, 1991). Cohen et al. describes a splice joint with a loss of less than 0.15 dB at 1.55 $\mu$m between an erbium doped fiber with a MFD of less than 4 $\mu$m and a communications fiber with a MFD of about 10 $\mu$m. This result was also achieved with an annealing step after the splice was formed where the heat source was an oxy-hydrogen flame of about 0.6 mm in length.

Zell and Cohen each use diffusion tapering to a limited extent by preferentially diffusing the smaller of the cores at the annealing stage and keeping the diffusion of the larger of the cores to a minimum in an effort to equalise the core diameters. Thus, the diffusion takes place primarily in one fiber only. Cohen uses a maximum diffusion time of only 200 seconds at 2000° C.

The difference in MFD and MFS between DCF and standard communications fiber is very large compared to the difference in fibers which have been spliced using the prior art. Thus, practitioners in the art have until now failed to provide a fusion splice that is capable, for operation at about 1.55 μm, of joining a multiple layer fiber to a communications fiber having radically different MFDs and MFSs, with a total splice loss less than 0.2 dB over a wide wavelength range. Similarly, splice losses between the standard communications fibre and high NA fibres have not been demonstrated below about 0.13 dB.

Another problem arises in attempting to produce a low loss joint between fibers of different diameters such as a standard telecommunications fiber and a high NA fibers with small diameters as compared with the telecommunications fiber. Such small diameter high NA fibers are used in coils for gyroscopes and hydrophones. The large difference in diameter can give rise to significant losses at the splice.

SUMMARY OF THE INVENTION

The present invention provides an improved annealed optical fiber joint between first and second doped optical fibers fusion spliced to one another, having different core sizes and different refractive index profiles. According to the invention, a longitudinal diffused region is associated with the splice, comprising a length of both fibers, wherein the amount of diffusion increases as the splice is approached along each fiber, the length of the diffused region in each fiber being 3 mm or more; and the fusion splice has a total splice loss, over the range of signal wavelengths, of less than 0.2 dB.

The provision of a substantial diffused region in both fibers gives rise to a reduction in splice loss according to the invention. The length of the diffused region in each fiber may be approximately 5 mm.

The invention also includes a method of annealing an optical fiber joint between first and second optical fibers fusion spliced to one another for operation in a predetermined wavelength range, the second fiber having a different core size and different refractive index profile from the first fiber, characterised by heating the fibers in the region of the fusion splice to produce diffusion of dopants therein to form a longitudinal diffused region comprising a length of both fibers wherein the amount of diffusion increases as the splice is approached along each fiber, the length of the diffused region in each fiber being 3 mm or more; and the fusion splice has a total splice loss, over the range of signal wavelengths, of less than 0.2 dB.

According to the invention, the cores of the two fibers are both diffused substantially to reduce splice loss. The amount of diffusion in each of the fibers is much greater than in the aforementioned prior art. The diffusion times may be much longer, for example 3 to 30 minutes at a peak temperature of 2000° C. The method according to the invention causes dopant diffusion in both of the fibers. However, for a good optical match at the joint is not necessary for the extent of the diffusion to be total. Indeed, a modest increase in the extent of the diffusion over that demonstrated in the prior art, provided that both fibers are exposed nearly equally to the diffusing heat source, can improve the joint losses considerably compared to the prior art.

In one example, one fiber is a standard step-index communication fiber, and the second fiber is a multilayered dispersion compensating fiber (DCF). A diffused dopant region is included adjacent the splice. The diameter of the communications fiber core increases gradually within the diffusion region as the splice joint is approached along this fiber. The diffusion of the various dopants in the DCF fiber also increases gradually as the splice joint is approached along this fibre. At the splice joint the diffusion of these dopants tend to cause the refractive index profile to converge optically to that of the diffused step index communications fiber. As a consequence of the diffusion region and its gradual longitudinal variation, the optical losses associated with the splice are relatively low, i.e. less than 0.2 dB at the operating wavelength, even when there is relatively high mismatch between the mode field diameters and mode field shapes (at a signal wavelength) in the respective fibers.

In a second example, one fiber is a standard step-index communication fiber, and the second fiber is a high NA fibre with a NA of 0.3. A diffused dopant region is included adjacent the splice. The diameter of both fiber cores increase gradually within the diffusion region as the splice joint is approached along the fibers. The diffusion of the core in the high NA fiber tends to cause it to converge optically to that of the diffused step index communications fiber. As a consequence of the diffusion region and its gradual longitudinal variation, the optical losses associated with the splice are relatively low i.e. less than 0.1 dB, even when there is relatively high mismatch between the mode field diameters (at a signal wavelength) in the respective fibers.

In another aspect, the invention provides a method of annealing an optical fiber joint between first and second optical fibers fusion spliced to one another for operation in a predetermined wavelength range, the first and second fibers having a different outer diameters, comprising heating and thereby softening the fibers in the region of the fusion splice, and axially forcing the spliced fibers towards one another to produce a fattening thereof in the region of the fusion splice.

This fattening technique according to the invention can ameliorate losses due to differences in optical fiber diameter but also can produce advantageous results with spliced fibers of the same diameter.

In a third example, one fiber is a standard step-index communication fiber with an outer diameter of 125 μm, and the second fiber is a high NA fibre, with a cladding diameter of 80 μm. A fattened region is produced in the region of the splice. The fattening is carried out so that diameters of both fiber cores increase gradually within the fattened region as the splice joint is approached along the fibers. A preferential fattening can be produced in the core in the high NA small diameter fiber which tends to cause it to converge optically to that of the fattened step index communications fiber. As a consequence of the fattened region and its gradual longitudinal variation, the optical losses associated with the splice are relatively low i.e. less than 0.1 dB, even when there is relatively high mismatch between the mode field and cladding diameters, at a signal wavelength, in the respective fibers.

BRIEF DESCRIPTION OF THE DRAWINGS

In order that the invention may be more fully understood, embodiments thereof will now be described by way of example with reference to the accompanying drawings wherein.

DETAILED DESCRIPTION

The splice joint between unlike fibres is clearly an abrupt transition in the optical path and can be a major source of loss for the propagating light. Radial and longitudinal diffusion of the dopants from the core regions can, from the point of view of the optical signal, smooth out the transition and reduce the losses at the joint. The greater the extent of diffusion the smoother is the optical transition and the less is the loss experienced at the joint. However care must be taken to ensure that the boundary between the diffused region and the undiffused region in each fiber does not itself create an abrupt transition in the optical path.

For any longitudinal transition in an optical waveguide there is an allowed transition rate, which will guarantee low loss for light passing through the transition. This allowed transition rate is governed by the so-called Adiabatic Criterion, which is well known to those skilled in the art. (see, for example, W. J. Stewart and J. D. Love, "Design limitations on tapers and couplers in single mode fibres" ECOC 1985 pp. 559–562.) For the present purposes, it is sufficient to note that the longitudinal profiles of the diffused core regions need to be controlled during the diffusion process so that the appropriate transition rate for each fiber is achieved.

Diffusion of the dopants in the fibre can be achieved by heating the fiber. The extent of diffusion is proportional to the heating temperature and heating time.

The simplest implementation of a gradual transition in the amount of diffusion along a length of optical fiber is to exploit the temperature gradient of a gas flame and to ensure that the flame is long enough that an appropriate transition rate is achieved about the splice point. More diffusion will occur at the centre of the flame where the fiber is hottest, and less and less diffusion occurs on moving out to the edge of the flame. A more elaborate approach for such a diffusion regime is to introduce a longitudinal back and forth motion to the diffusing flame, i.e. the flame can be made to oscillate over a length of the fiber. The amplitude of the oscillation can be varied during the diffusion process such that different regions of the fiber have different exposure times to the flame. Since the amount of diffusion depends on heating time, more diffusion will occur where the fiber is heated for the longest time.

In the prior art, where the fibers are heated with an electric arc, the extent of the heated region is about 1 to 2 mm. Any diffusion of the fiber core in such an arc will have a relatively abrupt transition. While this may be adequate for improving some fiber splice joints where a low extent of diffusion is required, it is not adequate for joints where the difference between the two fibers is considerable. In accordance with the invention, the length of the hot zone is increased and the fiber temperature is suitably graded within the hot zone, so that a suitable diffusion profile can be achieved.

It is accordingly possible to improve the joint loss between two fibers by lengthening and suitably grading the diffusion about the splice point. On examining the adiabatic criterion for different fiber types, it is found that different fiber types require different gradations of diffusion to achieve low loss. High NA matched cladding fibers can tolerate the fastest diffusion transition rates, the standard low NA matched cladding communications fibers require a slower transition rate, and the multiple layer fibers incorporating a depressed cladding layer need the slowest rate of all. Ideally the fibers on each side of the splice should be heat treated differently to achieve the lowest loss in the shortest possible length. However, in practice, it is convenient to heat treat both fibers according to the requirements of the slowest fiber type. A single flame with a graded temperature distribution about its centre is a suitable exemplary embodiment of this, which can be used to achieve greater diffusion in both fibers over a longer length of both of them as compared with Cohen supra.

For illustrative purposes, a preferred embodiment of the invention as applied to DCF fiber will now be described although it will be appreciated that the principles of the invention can be applied to other fiber types.

Figure 1A:
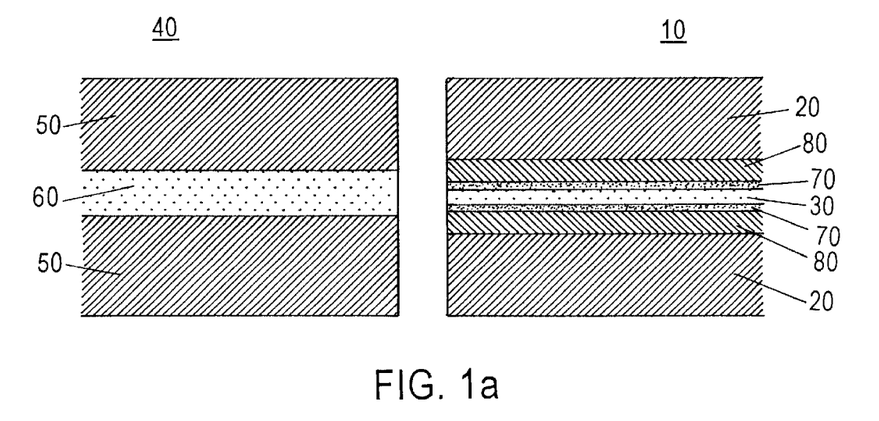
FIG. 1(a) is a schematic representation, not to scale, of a pair of dissimilar optical fibers to be joined.
Figure 1B:
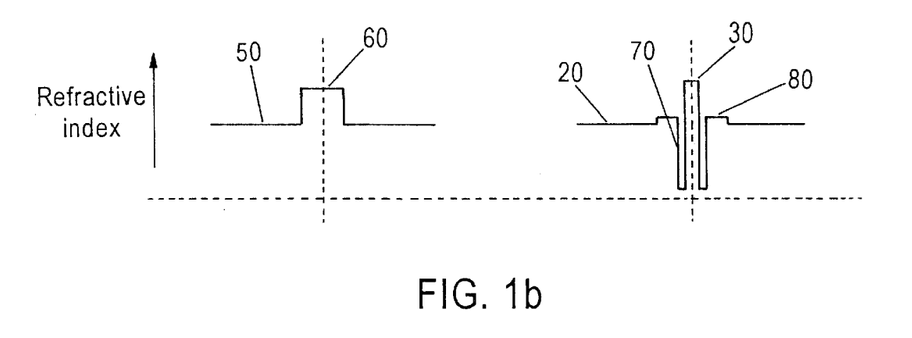
FIG. 1(b) is a schematic representation of the refractive index profiles of the two fibers.

With reference to FIG. 1, two fibers that are to be spliced together are shown. The splice is to be formed between first and second fibers 10 and 40. The fiber 10 comprises a DCF fiber. Fiber 10 includes a uniform cladding 20 and series of layers constituting a refractive index profile with raised inner core 30. The second fiber 40 is not a DCF fiber, and is typically an optical communication fiber. Fiber 40 includes a cladding 50 and a core 60. Fibers 10 and 40 are typically single mode fibers.

Cladding 20 of the DCF fiber exemplarily comprises silica glass doped with germnamia for the inner high refractive index raised core, doped with typically fluorine in the lowered refractive index ring 70 surrounding the core, with yet another slightly raised germania doped ring 80 surrounding that, surrounded finally with the uniform cladding 20. The outer diameter of cladding 20 is advantageously the same as the outer diameter of cladding 50. If fiber 40 is a standard optical communication fiber, then this outer diameter is generally about 125 $\mu$m.

Figure 2:
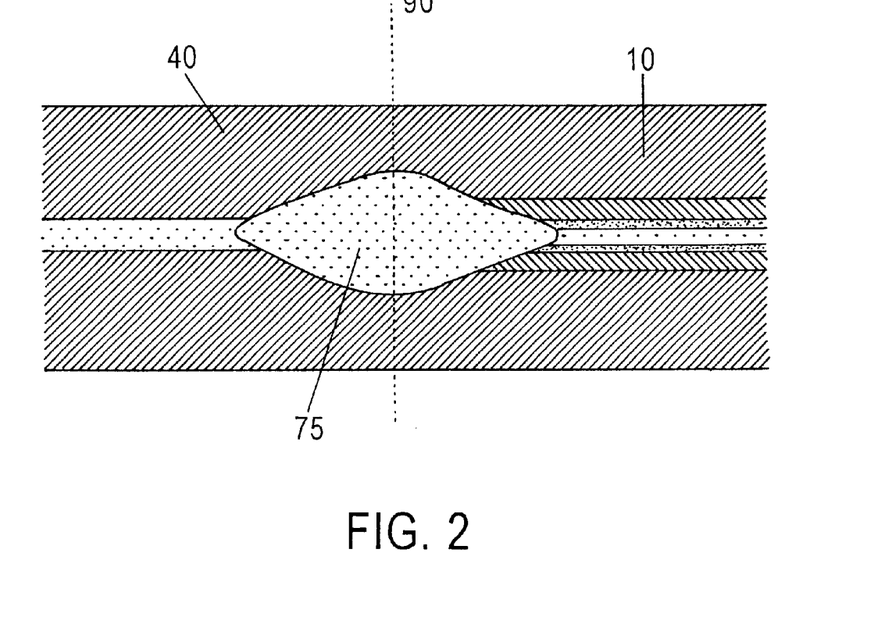
FIG. 2 is a schematic representation, not to scale, of a pair of dissimilar fibers joined by a fusion splice with diffusion of the refractive index on both sides of the splice.

Turning now to FIG. 2, fibers 10 and 40 are joined by a fusion splice 90. It is desirable for the total splice loss associated with splice 90 to be less than 0.3 dB over a wide wavelength range (160 nm.) centred on 1.55 $\mu$m.

For illustrative purposes, a procedure for making annealed and hence diffused fusion splices in accordance with the invention is described below. Splice losses less than 0.2 dB, and as low as about 0.15 dB, have been achieved by using this procedure to join standard communication fibers (SMF28) to Lucent DCF fibers.

In accordance with the illustrative procedure, the respective ends of fibers 10 and 40 that are to be joined are first prepared and then assembled in a conventional fusion splicing apparatus. Fusion splicing apparatuses using, e.g., flames, electric arcs, or tungsten filaments as heat sources are well known in the art and are readily commercially available. One suitable example of fusion splicing machine is the Model 30S manufactured by Fujikura Corporation.

Techniques of end preparation are well known in the art. By the use of such techniques, each of the ends to be joined is desirably cleaved such that it is inclined no more than 1 degree from a plane perpendicular to the longitudinal axis of the fiber. After the ends are prepared, the fibers are mounted and aligned in the splicing apparatus and spliced using best practice for the particular machine being used.

Figure 3:
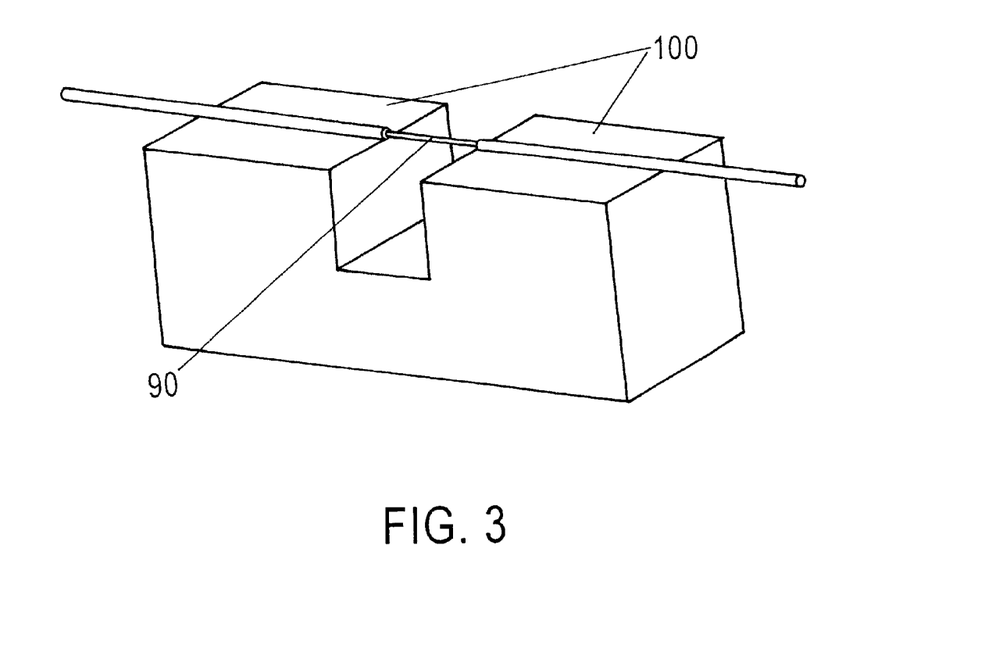
FIG. 3 is a schematic of the fiber holding mechanism of the heat treatment rig.
Figure 4:
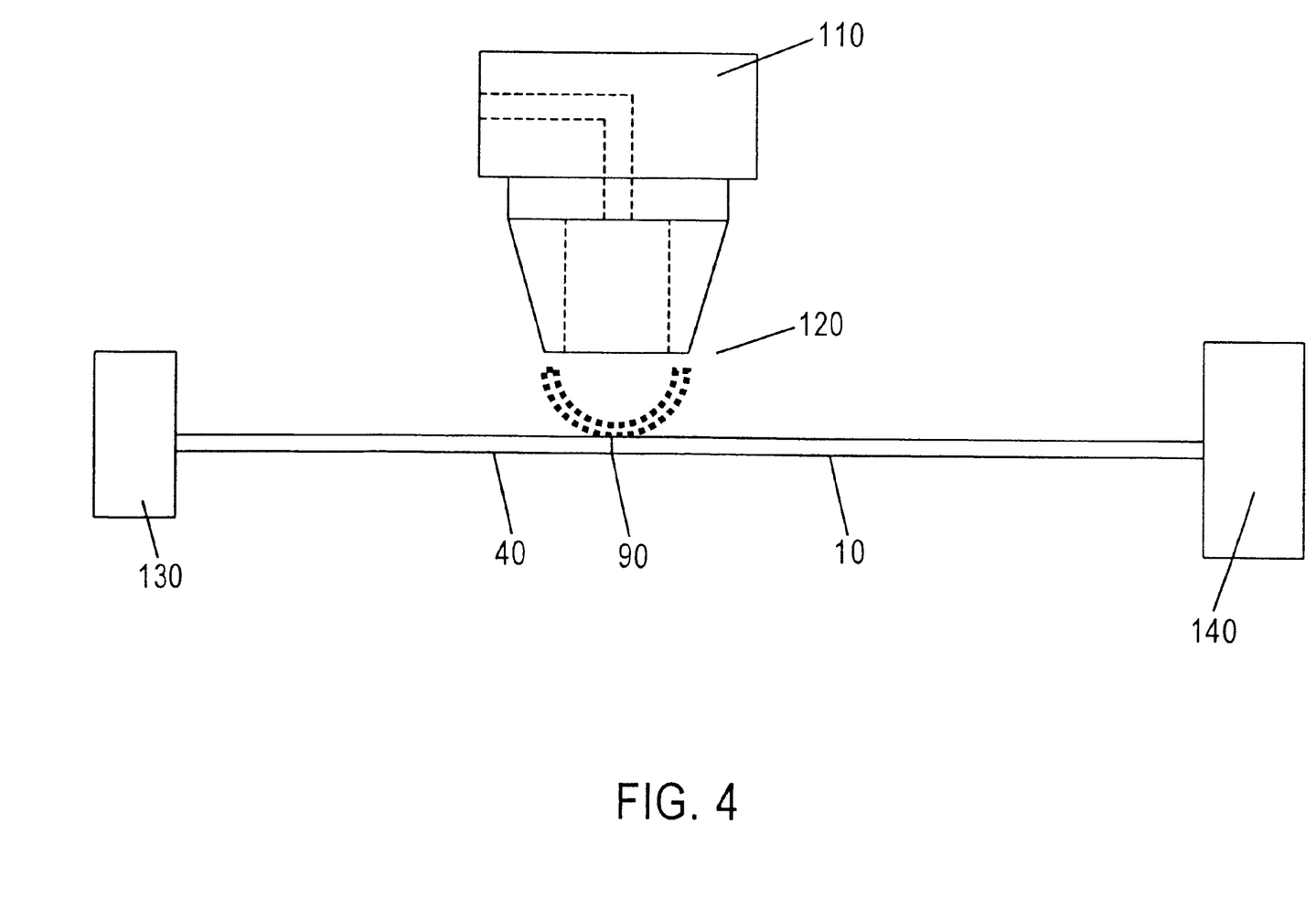
FIG. 4 is a drawing of a suitable burner head and a configuration for testing for splice loss.

The spliced fiber is then removed from the splicing machine and mounted in a heat treating rig such that the fibre is suspended between two aligned platforms 100 with the splice point 90 lying midway between them as illustrated in FIG. 3. A hydrogen torch is then introduced to the splice joint region. The torch head 110, typically made from ceramic or stainless steel, is introduced so that the gas flows vertically downwards onto the fibres. With reference to FIG. 4, the nozzle of the burner is about 8 mm diameter with a rim thickness of about 1 mm. The envelope of gas flame has an inverted dome shape 120. The torch height and the gas flow rates are adjusted to ensure that the fibre lies at a tangent to the flame and a length of about 10 mm of fibre is glowing in the flame, disposed symmetrically about the splice point 90 i.e. with about 5 mm in each of the fibers 10, 40. The gas flow rates can range from 100 to 400 ccm/min and is typically 300 ccm/min.

The heat treatment involves the heating of the splice region i.e., over a length of about 10 mm, as previously described, to a certain temperature and temperature gradient, and maintaining the splice region at that temperature distribution for a temperature-dependent tune. Diffusion of dopants occurs during the heat treatment and the longitudinal gradient in diffusion mirrors that of the heat gradient of the flame. As a result, with reference to FIG. 2, the cores of fiber 40, and refractive index distributions of fiber 10, both diffuse gradually more and more to form a dopant diffused region 75 along the heated region to such an extent that the optical distinctions between the fibers at the splice point 90 get blurred. Provided that optical guidance is maintained in the diffused region, the propagating light can traverse the splice with little or no loss.

Generally, it has been found according to the invention that an improved standard fiber/DCF fibre splice can be produced when the annealing takes place with a flame over a fiber length of 6–20 mm with at least a length of 3 mm of each fiber being heated in region of the joint. Thus, between 3–10 mm of each fiber is subject to the flame to produce the longitudinal dopant diffused region 75 shown in FIG. 2 wherein the amount of diffusion increases as the splice is approached along each fiber. Conveniently, the diffused region is produced in approximately 5 mm of each fiber 10,40. The splice is heated to a temperature within a range of 1700–2000° C. for a time in a range of 3,4 or 5 to 30 minutes. The resulting annealed joint between the fibers exhibits improved loss characteristics of less than 0.2 dB and typically in a range of 0.15–0.2 dB. The conditions are determined empirically for the actual fiber types used such as to provide diffusion in the fibers that results in the aforementioned adiabatic criterion being established in the transition between the cores of the spliced fibers.

The annealing technique just described can also be used with advantage for a fusion splice between standard telecommunications single mode fiber and a high NA fiber. Using the aforementioned conditions for the improved standard fiber/DCF fibre splice, the heating of the splice similarly produces a longitudinal dopant diffused region wherein the amount of diffusion increases as the splice is approached along each fiber. The resulting splice loss is less than 0.1 dB. The high NA fiber may have a value of NA greater than 0.1 and as high as 0.4. A typical value of NA is 0.3.

During the heat treatment, the throughput optical power of the splice may be monitored by a conventional technique, such as with an optical loss test set comprising a light source 130 and an optical power meter 140 shown in FIG. 4. It is generally observed that the power, detected by the power meter, continues to increase and eventually reaches saturation at a maximum value. Thus, an optimum heating time can readily be identified at a given temperature, such that the transmitted power is maximised when the peak temperature is maintained for that optimum time period. So, once the heating conditions are set, the need for optical monitoring is eliminated from the procedure.

EXAMPLE 1

A Lucent DCF single-mode fiber (Fiber type DK-SM) and a single-mode communication fiber (Corning SMF28) were joined by a fusion splice with extended heat treatment to cause diffusion.

The DCF fiber had an outer diameter of 125 $\mu$m and a MFD of about 5.0$\mu$m. The communication fiber had an outer diameter of 125 $\mu$m and a MFD of about 10 $\mu$m. The fiber ends to be joined were prepared as described above, aligned and spliced in a conventional fusion splicing apparatus.

The optical power transmitted across the fiber joint was monitored by means of a laser light source 130 coupled to the fiber 40 and the optical detector 140 coupled to the fiber 10. A combined length of about 10 mm, centred on the splice 90, was heated with a hydrogen flame. The torch had a ceramic head with an 8 mm aperture. The height was adjusted to produce a hot zone length of 10 mm on the fiber at a maximum temperature of 1700–2000° C. A hydrogen gas flow at a rate of about 300 cc/minute passed through the aperture.

The splice region was heated to the peak temperature, and maintained at that temperature for a time period of about 10 mins, at which point the maximum power transmission was observed. The resulting splice loss averaged over ten samples at a wavelength of 1.55 $\mu$m was 0.17 dB, with a standard deviation of 0.03 dB.

EXAMPLE 2

A Fibrecore High NA (NA=0.3) single-mode fiber (PS1500) manufactured by Fibercore plc of Southampton GB and a single-mode communication fiber (Corning SMF28) were joined by a fusion splice with extended heat treatment to cause diffusion.

The High NA fiber had an outer diameter of 125 $\mu$m and a MFD of about 4.0 $\mu$m. The communication fiber had an outer diameter of 125 $\mu$m and a MFD of about 10 $\mu$m.

The fiber ends to be joined were prepared as described above, aligned and spliced in the conventional fusion splicing apparatus.

The optical power transmitted across the fiber joint was monitored by a conventional technique. A combined length of about 10 mm, centred on the contact point, was heated with a hydrogen flame. The torch had a ceramic head with an 8 mm aperture. The height was adjusted to produce a hot zone length of 10 mm on the fiber. A hydrogen gas flow at a rate of about 200 cc/minute passed through the aperture.

The splice region was heated to a peak temperature of 1700–2000° C. and maintained at that temperature for a time period of about 5 mins, at which point the maximum power transmission was observed. The resulting splice loss averaged over ten samples at a wavelength of 1.55 $\mu$m was 0.05 dB, with a standard deviation of 0.01 dB.

Figure 5A:
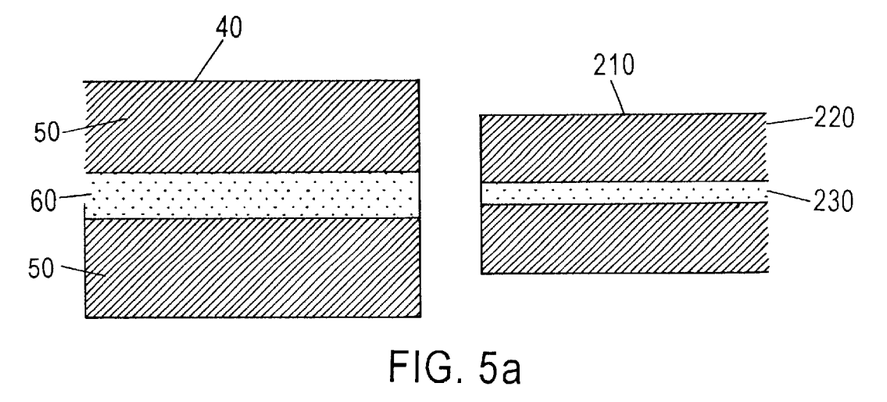
FIG. 5(a) is a schematic representation, not to scale, of a pair of unequal cladding and core diameter optical fibers to be joined in another method according to the invention.
Figure 5B:
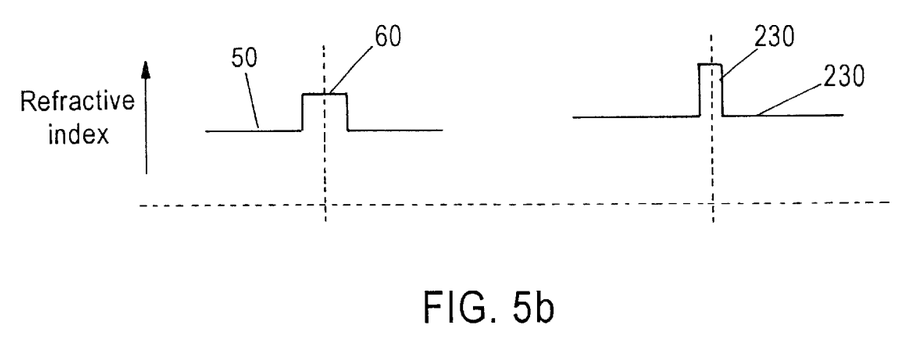
FIG. 5(b) is a schematic representation of the refractive index profiles of the two fibers shown in FIG. 5(a)

Another example of the invention will now be described with reference to FIGS. 5 and 6 which involves a fiber fattening technique. This can be used to join fibers of unequal diameter or even fibers of the same diameter. The fibers to be joined are shown in section in FIG. 5a and their refractive indices are shown in FIG. 5b. A relatively small diameter fiber 210 has a uniform cladding 220 and a raised inner core 230 is to be spliced to a relatively large diameter second fiber 40, typically an optical communication fiber. Fiber 40 includes a cladding 50 and a core 60. Fibers 210 and 40 are typically single mode fibers.

Cladding 220 of the small diameter fiber exemplarily comprises silica glass, doped with germania for the high refractive index raised core.

Figure 6:
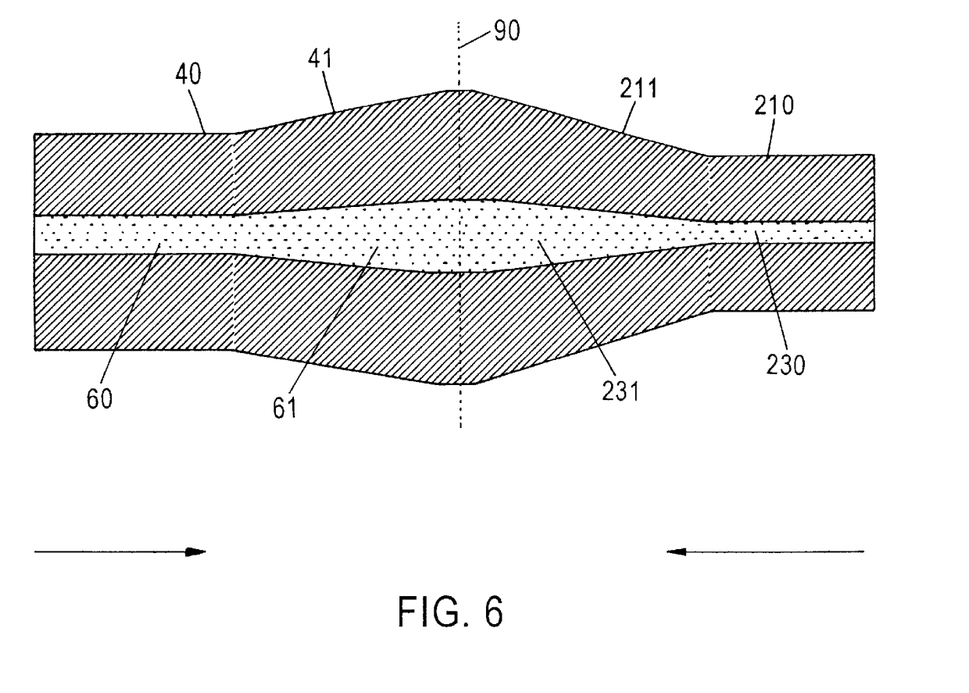
FIG. 6 is a schematic representation, not to scale, of a pair of unequal cladding and core diameter fibers joined by a fusion splice with fattening of the fiber on both sides of the splice.

Turning now to FIG. 6, fibers 210 and 40 are joined by a fusion splice 90. It is desirable for the total splice loss associated with splice 90 to be less than 0.2 dB at the operating wavelength.

For illustrative purposes, one procedure for making fattened fusion splices is described below. Splice losses less than 0.2 dB, and as low as about 0.1 dB, have been achieved by using this procedure to join standard communication fibers (SMF28) to both Fibercore's SM1500 and also the Gyrosil 80 μm diameter fiber manufactured by Spectran Inc.

In accordance with the illustrative procedure, the respective ends of fibers 210 and 40 that are to be joined are first prepared and then assembled in a conventional fusion splicing apparatus as discussed with reference to the previously described examples. The spliced fiber is then removed from the splicing machine and mounted in a heat treating rig such that the fibre is attached to and suspended between two aligned platforms 100 with the splice point 90 lying midway between them as illustrated in FIG. 3. The platforms are mounted on translation stages (not shown) so that they can be driven towards one another in the axial direction of the spliced fibers. A hydrogen torch is then introduced to the splice joint region in the manner previously described with reference to FIG. 4. The torch head 110, typically made from ceramic or stainless steel, is introduced so that the gas flows vertically downwards onto the fibres. With reference to FIG. 4, the nozzle of the burner is about 8 mm diameter with a rim thickness of about 1 mm. The envelope of gas flame has an inverted dome shape 120. The torch height and the gas flow rates are adjusted to ensure that the fibre lies at a tangent to the flame and a length of about 10 mm of fibre is glowing in the flame. The gas flow rates can range from 200 to 500 ccm/min and is typically 400 ccm/min.

The heat treatment involves the heating of the splice region to a certain temperature and temperature gradient typically within a range of 1700–2000° C., and driving the translation stages towards one another so that the fibres fatten in the flame as shown in regions 41, 211 in FIG. 6. The fibers are driven towards one another in the direction of the arrows in FIG. 6. The resulting axial shortening of the spliced fibers can be up to 2 cm and is typically in a range of 4 through 10 mm. The location of the burner and the travel distance of the translation stages is determined empirically for any given pair of fibres. The conditions for the process are determined empirically for the individual fiber types used in the splice because, as well as fattening, a certain amount of diffusion of dopants occurs during the heat treatment which can differ from one splice to the next. As a result, with reference to FIG. 6, the cores of fibers 40 and 210, both increase gradually in diameter along the heated region towards the splice in regions 61, 231 to such an extent that the optical distinctions between the fibers at the splice point get blurred.

In a modification, the flame may be disposed asymmetrically of the splice point so that preferential fattening of the smaller diameter fiber occurs. Also, the flame may be oscillated along the axial length of the fiber in the region of the splice. Preferably at least 3 mm of each fiber is heated by the flame to a temperature of 1700–2000° C. to produce fiber softening and core diffusion.

The optical power may be monitored throughout the process in the manner previously described with reference to FIG. 4 so that the movement of the translation stages can be stopped when the losses at the splice are a minimum. It is generally observed that the power, detected by the power meter, continues to increase and eventually reaches saturation at a maximum value after which additional fattening does not reduce the splice loss further.

EXAMPLE 3

A Fibrecore High NA 80 μm small diameter single-mode fiber (SM800G) and a single-mode communication fiber (Corning SMF28) were joined by a fusion splice and fattened The High NA fiber had an outer diameter of 80 μm and a MFD of about 4.0 μm. The communication fiber had an outer diameter of 125 μm and a MFD of about 10 μm. The fiber ends to be joined were prepared as described above, aligned and spliced in a conventional fusion splicing apparatus.

The optical power transmitted across the fiber joint was monitored by a conventional technique. A combined length of about 10 mm, centred on the splice point, was heated with a hydrogen flame in the previously described heat treating rig of FIG. 4. The torch had a ceramic head with an 8 mm aperture. The height was adjusted to produce a hot zone length of 10 mm on the fiber at a peak temperature of 1700–2000° C. A hydrogen gas flow at a rate of about 400 cc/minute passed through the aperture.

The splice region was heated to the peak temperature and the fibres were forced together until the point where maximum power transmission was observed. This occurred after an axial fiber shortening of 5 mm. The resulting splice loss averaged over ten samples at a wavelength of 1.55 μm was 0.1 dB, with a standard deviation of 0.04 dB.

Many modifications and variations fall within the scope of the invention. For example, different types of DCF fibers may be used instead of the Lucent fiber previously described and different types of high NA fibers can be used. Also, the invention has application to splices between other dissimilar fibers to reduce the splice loss. Moreover, the principles of fattening described with reference to the third example can be applied to the first and second examples.

What is claimed is:

1. An annealed optical fiber joint comprising first and second doped optical fibers fusion spliced to one another for operation in a predetermined wavelength range, the second fiber having a different core size and different refractive index profile from the first fiber, and a longitudinal diffused region associated with the fusion splice, the longitudinal diffused region comprising a length of both of the fibers wherein the amount of diffusion increases as the splice is approached along each fiber, the length of the diffused region in each fiber being 3 mm or more; and the fusion splice having a total splice loss, over the range of signal wavelengths, of less than 0.2 dB.

2. A joint according to claim 1 wherein the first fiber comprises a standard telecommunications single mode fiber and the second fiber comprises a DCF fiber.

3. A joint according to claim 2 wherein the DCF fiber comprises a core surrounded by an outer cladding, the core having a higher refractive index than the cladding, and a dispersion compensation region between the core and outer cladding.

4. A joint according to claim 3 wherein the second fiber has a value of NA approximately equal to 0.3 mm.

5. A joint according to claim 3 wherein the splice loss is less than 0.1 dB.

6. A joint according to claim 1 wherein the first fiber comprises a standard telecommunications single mode fiber and the second fiber has a value of NA which is higher than that of the first fiber.

7. A joint according to claim 6 wherein the second fiber has an erbium doped core.

8. A joint according to claim 1 wherein the first fiber has a core diameter in a range of 8–11 $\mu$m and the second fiber has a core diameter in a range of 2–8 $\mu$m.

9. A joint according to claim 1 wherein the length of the diffused region is less than 10 mm in each fiber.

10. A joint according to claim 1 wherein the length of the diffused region is approximately 5 mm in each fiber.

11. An annealed optical fiber joint according to claim 1 configured for operation in a wavelength range centred on 1.55 $\mu$m.

12. A method of annealing an optical fiber joint between first and second optical fibers fusion spliced to one another for operation in a predetermined wavelength range, the second fiber having a different core size and different refractive index profile from the first fiber, comprising heating the fibers in the region of the fusion splice to produce diffusion of dopants therein to form a longitudinal diffused region comprising a length of both fibers wherein the amount of diffusion increases as the splice is approached along each fiber, the length of the diffused region in each fiber being 3 mm or more; and the fusion splice has a total splice loss, over the range of signal wavelengths, of less than 0.2 dB.

13. A method according to claim 12 including carrying out the heating of the fibers with a gas flame.

14. A method according to claim 12 wherein the heating of the fibers is carried out to a peak temperature between 1700° C. and 2000° C.

15. A method according to claim 12 wherein the heating is carried out for between 3 and 30 minutes.

16. A method according to claim 12 including monitoring optical splice loss for the fusion splice whilst carrying out the heating, and ceasing the heating when the splice loss reduces to a particular level.

17. A method according to claim 12 wherein the heating is carried out with a gas torch.

18. A method according to claim 17 wherein the torch burns hydrogen and including controlling the flow of hydrogen to the torch to be between 100 and 400 cc/min.

19. A method according to claim 17 including oscillating the torch along the fibers to produce a maximum temperature at the splice and a temperature gradation therefrom along the fibers.

20. A method according to claim 12 including producing the splice between a standard telecommunications fiber and a DCF fiber.

21. A method according to claim 12 including producing the splice between a standard telecommunications fiber and a high NA fiber.

22. An annealed optical fiber joint produced by a method as claimed in claim 12.

23. A method according to claim 12 including placing the fusion splice between the fibers in a heat treating rig with translation stages attached to the fibers, heating the fusion splice, and concurrently driving the translation stages towards one another to produce the fattening.

24. A method of annealing an optical fiber joint between first and second optical fibers fusion spliced to one another for operation in a predetermined wavelength range, the first and second fibers having a different outer diameters, comprising heating and thereby softening the fibers in the region of the fusion splice, and axially forcing the spliced fibers towards one another to produce a fattening thereof in the region of the fusion splice.

25. A method according to claim 24 including heating the fibers asymmetrically of the joint such as to produce a greater fattening of the fiber of smaller diameter.

26. A method according to claim 24 wherein the first fiber has an outer diameter of 125 $\mu$m and the second fiber has a diameter of 80 $\mu$m.

27. A method according to claim 24 wherein the heating of the fibers is carried out to a peak temperature between 1700° C. and 2000° C.

28. A method according to claim 24 including performing the fattening until the fusion splice has a total splice loss, over the range of signal wavelengths, of less than 0.2 dB.

29. A method according to claim 24 wherein the axial forcing of the fibers towards one another is carried out such as to produce an axial fiber shortening of up to 2 cm.

30. A method according to claim 24 wherein the axial forcing of the fibers towards one another is carried out such as to produce an axial fiber shortening of 4 mm through 10 mm.

* * * * *